3,413,250
PRINTING INK COMPRISING PARTICULATE INTERPOLYMER, WAX-LIKE MATERIAL AND ROSIN ESTER
Arleen S. Varron, Wayne, and Paul D. Whyzmuzis, Clifton, N.J., assignors to Interchemical Corporation, New York, N.Y., a corporation of Ohio
No Drawing. Filed Oct. 26, 1964, Ser. No. 406,578
17 Claims. (Cl. 260—23)

ABSTRACT OF THE DISCLOSURE

A printing ink having as a vehicle a volatile hydrocarbon solvent having dissolved therein a polyterpene resin, copolymers of alpha-methylstyrene and vinyl toluene, or a pentaerythritol ester of rosin and having dispersed therein (A) an interpolymer of (1) acrylic alkyl esters, (2) acrylonitrile or methacrylonitrile, (3) acrylic, methacrylic, cinnamic, atropic, or crotonic acid, and (4) a monovinylidene aromatic hydrocarbon, the range of percentage composition being specified, and (B) polyethylene, polyethylene glycol, or polyethylene distearate.

---

This invention relates to a novel printing ink which is particularly useful in that it may be used on polyolefins with effective results.

The problem of printing and coating on polyolefins, particularly polyethylene and polypropylene is well known in the printing art. In general polyolefins display very poor adhesion to printing and coatings applied thereto. Slight abrasion such as gentle scraping with the fingernail removes printing from the polyolefins as does even minimal bending or stretching.

Many techniques have been used in treating polyolefins in order to overcome this lack of adhesion. These techniques usually involve pretreating or conditioning the surfaces of the polyolefins in order to make these surfaces adhere to printing or coatings applied thereto. Some widely used pretreating techniques are: treating the surface by the photochemical action of chlorine to cause surface oxidation; acid treatment of the surface; flame treatment of the surface; exposing the surface to the action of ozone as well as treatment of the surface with electron beams or gamma rays. Because such pretreating techniques are time consuming, difficult and expensive, printing inks and coating compositions which may be effectively used on untreated polyolefins are continually being sought by the polyolefin industry.

Copending application S.N. 215,285, filed Aug. 7, 1962 by the present applicants, now U.S. Patent 3,162,611, is directed to novel printing inks comprising vehicles which are dispersions, in a volatile hydrocarbon solution of cyclized rubber or limed rosin, of particulate interpolymers which form the particulate phase of the latices described in U.S. Patent 2,767,153. In addition to said interpolymers, the vehicles further contain dispersions, in said solutions, of wax-like polyethylenes or polyethylene derivatives such as polyethylene glycol and polyethylene glycol distearate. The inks of this copending application give printing of outstanding adhesion as well as excellent scratch resistance when used on polyolefins.

We have now discovered that the same effective results on polyolefins may be achieved by substituting a volatile hydrocarbon solution of a member selected from the group consisting of polyterpene resins, copolymers of alpha-methyl styrene and vinyl toluene and pentaerythritol esters of rosin for the hydrocarbon solution of cyclized rubber or the limed rosin in the ink of the copending application. The pentaerythritol esters of rosin are formed by the esterification with pentaerythritol of rosin, polymerized rosin and maleated or fumarated rosin. The polyterpene resins include both the conventional terpene homopolymers e.g., the polymerization products of beta-pinene as well as the terpenephenolic copolymers which are the condensation products of polyterpene polymers with phenol-formaldehydes.

The interpolymers of U.S. Patent 2,767,153 are described as interpolymers comprising 35–60 parts by weight of an unsaturated ester taken from the group consisting of straight-chain and branched-chain saturated aliphatic alcohol esters of acrylic and methacrylic acids containing a total of about 5–20 carbon atoms in the alcohol radical of which about 5–14 carbon atoms comprise the longest continuous chain thereof, about 3–10 parts by weight of an unsaturated nitrile taken from the group consisting of acrylonitrile and methacrylonitrile, about 2–5 parts by weight of an unsaturated monocarboxylic acid taken from the group consisting of acrylic acid, methacrylic acid, cinnamic acid, atropic acid, and crotonic acid and, correspondingly, about 60–25 parts by weight of a monovinylidene aromatic hydrocarbon, the interpolymer particles in said latex having an average diameter of about 0.1 to 0.5 micron. It has been found that best results are obtained when said interpolymer comprises from 35–45 parts of either ethylhexyl acrylate, decyl acrylate or tridecyl acrylate; 3–10 parts of acrylonitrile, 2–5 parts of methacrylic acid and 60–40 parts of styrene. (It should be noted that all proportions set forth in the present specification and claims are by weight unless otherwise stated.)

The wax-like dispersed material may be a low molecular weight waxy polyethylene, e.g., polyethylene having a molecular weight of 40,000 or lower, most preferably from 2500 to 10,000. Polyethylene glycol "waxes" having molecular weights of less than 20,000 as well as polyethylene glycol distearate may also be used as the wax-like dispersed material.

The type of solvent used will depend to a large extent on the nature of the printing process in which the ink is to be used. For example, when the printing on polyolefins is carried out by dry-offset, letterpress, lithographic and silk screen techniques, predominantly paraffinic hydrocarbon solvents having boiling ranges from about 300° to 650° F. are preferred. For gravure or flexographic printing paraffinic solvents having boiling ranges from 145 to 300° F. are used as well as combinations of said paraffinic solvents with alcohols and esters.

Preferably the ratio of the dissolved pentaerythritol esters of rosin, polyterpenes or vinyl toluene/alpha-methyl styrene to interpolymer in the inks is from 0.5:1 to 2:1. Preferably from about 0.10 to 0.30 part and most preferably from about 0.15 to 0.25 part of said waxy-material are dispersed for each part of the dissolved resins.

While the inks of this invention display excellent adhesion to untreated polypropylene and low density polyethylene, the adhesion to high density polyethylene is not up to a par with the adhesion to the polypropylene and low density polyethylene. However, the addition of a small amount of long-chain fatty amides or long-chain fatty acids to the composition brings the adhesion to high density polyethylene up to a par with the adhesion to the other polyolefins. Among the long-chain fatty amides which may be used are octanamide, decanamide, dodecanamide, tetradecanamide, hexadecanamide, octadecanamide, 9-octadecenamide, 9–12 octadecadienamide and eicosanamide. Suitable fatty acids for this purpose include stearic acid and oleic acid. When used, the fatty amide or the fatty acid preferably constitutes from 3% to 6% of the weight of the pentaerythritol ester or rosin or of the other dissolved resins.

In preparing the novel inks of this invention, the resinous solution and the aqueous interpolymer latex are mixed together on appropriate mixing or milling means e.g., a 3 roll mill or a dough mixer. The water is then separated. This may be accomplished by applying sufficient heat to evaporate the water under the ambient conditions. Alternatively, we have also found it convenient to add an "emulsion breaker" which helps bring about a separation of the aqueous and interpolymer phases of the latex. In general, emulsion breakers usually react with emulsifying agents present and, in effect, neutralize said agents so that they can no longer function. Since the emulsifying agents used in the interpolymer latices of U.S. Patent 2,767,153 are anionic emulsifying agents, the emulsion breakers are preferably inorganic metallic salts and metallic acetate salts. Best results have been achieved using the salts of calcium, aluminum and zinc, e.g., calcium sulfate, aluminum sulfate and zinc sulfate. After the latex separates into its two phases, the water which distinctly separates from the mixture of latex and resinous solution is removed by decanting. The remainder of the water may be removed by vacuum distillation.

After the removal of the water, the pigment and the wax-like material are added to the dispersion of interpolymer in the resinous solution and the mixture is milled or mixed on a suitable device such as a 3 roll mill or a dough mixer to uniformly disperse the pigment and the wax-like material. While it is preferred to add the wax-like material at the same time that the pigment is added, the wax-like material may be added earlier, e.g., at the time that the latex and the resinous solution are mixed together.

The pigment is added in the standard proportions used in formulating printing inks, e.g., the pigment may constitute in the order of 10% to 70% of the total ink weight. Furthermore, any of the pigments used in conventional printing inks may be used in the ink of this invention.

In addition to the ingredients set forth above, the inks of this invention may contain any of the conventional additives used in inks. The ink may contain the conventional antioxidants including phenolic substances such as 2,6-ditertirary-butyl 4-methylphenol, hydroquinone and resorcinol and aromatic amines such as diphenylamine. The ink may also contain conventional surface-active agents such as alcohol fatty acids, ether, ether alcohols, esters, fatty alcohol sulfates and nitrogen compounds such as amides and amines.

While the present specification has been primarily concerned with inks, it should be understood that the novel vehicle of this invention may be used as a coating composition for polyolefins either in the pigmented or the unpigmented state.

It should also be understood that the ink of this invention may be used in printing on a wide variety of substrates other than polyolefins. Such other substrates include silk and other fabrics, paper cellulosic such as cellulose acetate, acrylic polymers such as polymethylmethacrylate, rubber and vinyl copolymers such as polymers of vinylidene chloride.

The following examples will more fully set forth some specific embodiments of this invention.

EXAMPLE 1

53.9 parts of an interpolymer latex having a 28% solids content of an interpolymer of 40% 2-ethylhexyl acrylate, 52% styrene, 6% acrylonitrile and 2% methacrylic acid prepared in accordance with U.S. Patent 2,767,153—Example 1—are slowly added to 25.9 parts of a 50% solution of Pentalyn K (pentaerythritol ester of dimerized rosin having a softening point of 188–197° C. and a specific gravity of 1.09) in a hydrocarbon solvent having a boiling range of 474–498° F. and a KB value of 27–28 over a period of 7 minutes on a 3 roll mill steam heated to a temperature of 220–250° F. The mixture is milled at this temperature until the water in the latex has substantially evaporated. (This may be determined by a water determination test indicating a water content of less than 1%.) The mill is then cooled and 9.5 parts of the above hydrocarbon solvent are added. After which 12.8 parts of phthalocyanine blue, 11.2 parts of Epolene N–10 (a polyethylene wax having a softening point of 111° C., ring and ball method, a density of 0.927 and a molecular weight of 2500) and, optionally, as an antioxidant, 4.8 parts of 2,6-di-tert-butyl 4-methylphenol (to improve shelf life) are added and the mixture is ground on the cold mill to produce a uniform dispersion of pigment polyethylene wax and said interpolymer in the vehicle which is a solution of the Pentalyn K in said hydrocarbon solvent.

The ink produced is then tested by being used for printing on untreated polypropylene, low density polyethylene and high density polyethylene by the "dry-offset" printing method with a 15 minute drying at 190° F. (a method conventionally used for printing on polyolefins). The resulting printing displays excellent gloss, excellent rub resistance as well as excellent adhesion to polypropylene and low density polyethylene as demonstrated by the standard "Scotch Tape Test." The printed polypropylene and low density polyethylene also had excellent scratch resistance as demonstrated by scratching the printing using the front part of the nail. The "Scotch Tape Test" is carried out by pressing the adhesive face of Scotch tape against the printing and then jerking the tape away from the printed surface and determining whether any printed material is pulled away by the tape. While the high density polyethylene printing displays excellent gloss and rub resistance, the adhesion and scratch resistance are not as good as in the case of the low density polyethylene and the polypropylene.

EXAMPLE 2

Example 1 is repeated using the same conditions, proportions and constituents except that 0.5 part of Armid HT, a fatty amide mixture comprising 22% hexadecanamide, 75% octadecanamide and 3% 9-octadecanamide is added at the same time that the pigment and polyethylene wax are added. The resulting printing ink displays the same desirable printing properties on polyethylene and polypropylene as does the ink of Example 1 and in addition displays adhesion and scratch resistance on high density polyethylene which is the equivalent of the excellent adhesion and scratch resistance of printing on low density polyethylene and polypropylene.

The results in Example 2 are the same when either N,N' ethylene bis-stearamide or stearic acid are substituted for Armid HT.

EXAMPLE 3

58.7 parts of an interpolymer latex having a 48% solids content of an interpolymer of 40% 2-ethylhexyl acrylate, 52% styrene, 6% acrylonitrile and 2% methacrylic acid prepared in accordance with U.S. Patent No. 2,767,153—Example 1—are slowly added to 28.2 parts of a 50% solution of Pentalyn K in a hydrocarbon solvent having a boiling range of 516–543° F. and a KB value of about 27–29 in a dough mixer over a period of about 8 minutes. Since said interpolymer latex is conventionally supplied commercially containing an anionic emulsifying agent, it is preferable to include in the solution used herein an "emulsion breaker" which reacts with the anionic emulsifying agent to form an insoluble salt. Here we use 4.6 parts of a 50% aqueous solution of aluminum sulfate as emulsion breaker. The mixing on the dough mixer is continued until a homogeneous mixture is produced. A portion of the water will separate during the mixing and is removed. The remainder of the water is removed by vacuum stripping to a water content of less than 1%. The mixture is then permitted to cool to the ambient temperature and there is added 4.7 parts of Pentalyn K and 38 parts of the aforementioned solvent with mixing on the dough mixer. If long shelf life is desired 1 part of an antioxidant such as 2,6-di-tert-butyl 4-methylphenol may be added at this point.

Now, a premixture of 17.2 parts of Pentalyn K, 30 parts of Epolene N-10 (a polyethylene wax having a softening point of 111° C., a density of 0.927 and a molecular weight of 2500) and 52.2 parts of the above mentioned hydrocarbon solvent are milled on a 3 roll mill to disperse the wax.

An ink is then prepared by milling a mixture comprising 9 parts of said premixture, 59 parts of the mixture made on the dough mixer as described above, 25 parts of benzidine yellow pigment and 0.9 part of Armid HT on a 3 roll mill to produce a uniform dispersion of pigment and said interpolymer in the Pentalyn K hydrocarbon solvent vehicle.

The resulting ink is then used in printing on both high and low density polyethylene and polypropylene. The printing on all of said substrates displays excellent adhesion, scratch resistance, gloss and rub resistance.

EXAMPLE 4

To a mixture of 33.4 parts of 50% solution of Pentalyn G (the pentaerythritol ester of the maleic adduct of rosin formed by esterifying the reaction product of maleic anhydride and rosin with pentaerythritol. Softening point 130–140° C.) in a hydrocarbon solvent having a boiling range of 548 to 584° F. and a KB value of about 28 and 5.72 parts of a 50% solution of aluminum sulfate in water in a dough mixer, there are added 73 parts of an interpolymer latex having a 48% solids content of an interpolymer of 40% 2-ethylhexyl acrylate, 52% styrene, 6% acrylonitrile and 2% methacrylic acid prepared in accordance with U.S. Patent No. 2,767,153 (Example 1). The mixture is continuously mixed at a temperature of about 140° F. A portion of the water in the mixture separates into a separate phase and is removed. The remaining water is removed by vacuum stripping. 23.2 parts of the hydrocarbon solvent are added.

The following ink is then formulated with the above composition in a dough mixer:

| | Parts |
|---|---|
| Above composition | 46.5 |
| Chrome orange pigment | 33.0 |
| Polyethylene glycol (M.W. 6000–7500) | 2.8 |
| Armid HT | 0.5 |
| Above hydrocarbon solvent | 17.2 |

This ink is used for printing on high and low density polyethylene and polypropylene by the silk screen process. The resulting printed structures display excellent "Scotch tape" test adhesion and scratch resistance.

EXAMPLE 5

Example 4 is repeated using the same constituents, proportions and conditions except that in place of the interpolymer latex of Example 4, there is used an interpolymer latex having a 50% solids content of an interpolymer of 40% decyl acrylate, 52% styrene, 6% acrylonitrile and 2% methacrylic acid prepared in accordance with U.S. Patent No. 2,767,153 (Example VII.) The ink produced has the same desirable properties for printing on polyolefins as does the ink of Example 4.

EXAMPLE 6

Example 3 is repeated using the same constituents, proportions and conditions except that in place of the interpolymer latex of Example 3, there is used an interpolymer latex having a 50% solids content of an interpolymer of 40% tridecyl acrylate, 52% styrene, 6% acryonitrile and 2% methacrylic acid prepared in accordance with U.S. Patent No. 2,767,153 (Example VIII). The ink produced has the same desirable properties for printing on polyolefins as does the ink of Example 3.

EXAMPLE 7

Example 3 is repeated using the same constituents, proportions and conditions except that in place of Epolene N-10, there is used a polyethylene wax having a molecular weight of 10,000, a density of 0.947 and a softening point of 126° C. (ring and ball method). The ink produced has the same desirable properties for printing on polyolefins as does the ink of Example 3.

The following waxy compositions may be used in Example 7 in place of Epolene N-10 with the same results as in Example 7: polyethylene softening point 106° C. and M.W. 40,000; polyethylene M.W. 1400; Carbowax 6000 (polyethylene glycol having a molecular weight of 6000–7500); Carbowax 20,000 (polyethylene glycol having a molecular weight of 18,000–20,000) and the distearic acid ester of 6000 molecular weight polyethylene glycol.

EXAMPLE 8

Example 3 is repeated using the same constituents, proportions and conditions except that in place of the Pentalyn K, where there is used Piccolyte S135 (polyterpene resin homopolymer made by the polymerization of beta-pinene). The ink produced has the same desirable properties for printing on polyolefins as does the ink of Example 3.

EXAMPLE 9

Example 3 is repeated using the same constituents, proportions and conditions except that in place of the Pentalyn K, there is used Piccotex 120 (copolymer of vinyl toluene and alpha-methyl styrene having a M.P. of 120° C.). The ink produced has the same desirable properties for printing on polyolefins as does the ink of Example 3, except that the printing is not quite as hard.

EXAMPLE 10

Example 3 is repeated using the same constituents, proportions and conditions except that in place of the Pentalyn K, there is used Durez 220 (terpene-phenolic resin, the condensation product of polyterpene with the product of the condensation of phenol and formaldehyde). The ink produced has the same desirable properties for printing on polyolefins as does the ink of Example 3.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A novel ink comprising pigment dispersed in a vehicle comprising about 1 part by weight of (A) a dispersion of a particulate interpolymer of (1) about 35–60 parts by weight of an unsaturated ester taken from the group consisting of straight-chain and branched-chain saturated aliphatic alcohol esters of acrylic and methacrylic acid containing a total of about 5–20 carbon atoms in the alcohol radical of which about 5–14 carbon atoms comprise the longest continuous chain thereof, (2) about 3–10 parts by weight of an unsaturated nitrile taken from the group consisting of acrylonitrile and methacrylonitrile, (3) about 2–5 parts by weight of an unsaturated monocarboxylic acid taken from the group consisting of acrylic acid, methacrylic acid, cinnamic acid, atropic acid and crotonic acid and, correspondingly, (4) about 60–25 parts by weight of a monovinylidene aromatic hydrocarbon, the particles of said interpolymer having an average diameter of about 0.1 to 0.5 micron and about 0.1 to 0.3 part by weight of (B) a dispersion of a wax-like material selected from the group consisting of polyethylene having a maximum molecular weight of about 40,000 polyethylene glycol having a maximum molecular weight of 20,000 and polyethylene glycol distearate in a solution of (C) about ½ to 2 parts by weight of a member selected from the group consisting of a polyterpene resins, copolymers of alpha-methyl styrene and vinyl toluene and a pentaerythritol ester of rosin in (D) a volatile hydrocarbon solvent.

2. The ink of claim 1 wherein said interpolymer comprises (1) about 35–45 parts of 2-ethylhexyl acrylate, (2) about 3–10 parts of acrylonitrile), (3) about 2–5 parts of methacrylic acid, and, correspondingly, (4) about 60–40 parts of styrene, the interpolymer particles in said vehicle having an average diameter of about 0.1 to 0.5 micron.

3. The ink of claim 1 wherein said interpolymer comprises (1) about 35–45 parts of decyl acrylate, (2) about 3–10 parts of acrylonitrile, (3) about 2–5 parts of methacrylic acid, and, correspondingly, (4) about 60–40 parts of styrene, the interpolymer particles in said vehicle having an average diameter of about 0.1 to 0.5 micron.

4. The ink of claim 1 wherein said interpolymer comprises (1) about 35–45 parts of tridecyl acrylate, (2) about 3–10 parts of acrylonitrile, (3) about 2–5 parts of methacrylic acid, and, correspondingly, (4) about 60–40 parts of styrene, the interpolymer particles in said vehicle having an average diameter of about 0.1 to 0.5 micron.

5. The ink of claim 1 wherein said (C) member is a pentaerythritol ester of rosin.

6. The ink of claim 5 wherein said ester is the pentaerythritol ester of dimerized rosin.

7. The ink of claim 5 wherein said ester is the pentaerythritol ester of maleated rosin.

8. The ink of claim 1 wherein said (C) member is a copolymer of alpha-methyl styrene and vinyl toluene.

9. The ink of claim 1 wherein said (C) member is a polyterpene resin.

10. The ink of claim 9 wherein said polyterpene resin is terpene homopolymer.

11. The ink of claim 9 wherein said polyterpene resin is the reaction product of terpene homopolymer and the condensation product of phenol and formaldehyde.

12. The ink of claim 1 further containing 0.5 part by weight of a long chain fatty amide.

13. The ink of claim 1 further containing 0.5 part by weight of stearic acid.

14. The ink of claim 1 wherein said wax-like material is polyethylene glycol having a maximum molecular weight of 20,000.

15. A novel ink comprising pigment dispersed in a vehicle comprising about 1 part by weight of (A) a dispersion of a particulate interpolymer of (1) about 35–45 parts of 2-ethylhexyl acrylate, (2) about 3–10 parts of acrylonitrile, (3) about 2–5 parts of methacrylic acid, and, correspondingly, (4) about 40–60 parts of styrene, the interpolymer particles in said vehicle having an average diameter of about 0.1 to 0.5 micron, and about 0.1 to 0.3 part by weight of (B) a dispersion of polyethylene having a molecular weight between 2500 and 10,000 in (C) about ½ to 2 parts by weight of a solution of a member selected from the group consisting of polyterpene resin, copolymers of vinyl toluene and alpha-methyl styrene and a pentaerythritol ester of rosin in a hydrocarbon solvent.

16. The ink of claim 15 wherein said member is a pentaerythritol ester of rosin.

17. A novel coating composition comprising about 1 part by weight of (A) a dispersion of a particulate interpolymer of (1) about 35–60 parts by weight of an unsaturated ester taken from the group consisting of straight-chain and branched-chain saturated aliphatic alcohol esters of acrylic and methacrylic acid containing a total of about 5–20 carbon atoms in the alcohol radical of which about 5–14 carbon atoms comprise the longest continuous chain thereof, (2) about 3–10 parts by weight of an unsaturated nitrile taken from the group consisting of acrylonitrile and methacrylonitrile, (3) about 2–5 parts by weight of an unsaturated monocarboxylic acid taken from the group consisting of acrylic acid, methacrylic acid, cinnamic acid, atropic acid and crotonic acid and, correspondingly, (4) about 60–25 parts by weight of a monovinylidene aromatic hydrocarbon, the particles of said interpolymer having an average diameter of about 0.1 to 0.5 micron and about 0.1 to 0.3 part by weight of (B) a dispersion of a wax-like material selected from the group consisting of polyethylene having a maximum molecular weight of about 40,000, polyethylene glycol having a maximum molecular weight of 20,000 and polyethylene glycol distearate in a solution of (C) about ½ to 2 parts by weight of a pentaerythritol ester of rosin in (D) a volatile hydrocarbon solvent.

References Cited

UNITED STATES PATENTS

| | | | |
|---|---|---|---|
| 2,265,639 | 12/1941 | Forman | 106—28 |
| 2,640,782 | 6/1953 | Bloch et al. | 106—28 |
| 3,000,868 | 9/1961 | Powers | 260—88.2 |
| 3,162,611 | 12/1964 | Varron et al. | 260—4 |
| 3,245,825 | 4/1966 | Fessler et al. | 117—38 |

OTHER REFERENCES

Apps: "Printing Ink Technology," 1958, pp. 315. 389, copy in Group 140; TP949A6C2 Hercules Synthetic Resins, 1949, p. 13, copy in Group 140.

Payne: "Organic Coating Technology," vol. I, 1954, p. 184, copy in Group 140, TP935P38C3.

Zimmerman et al: "Handbook of Material Trade Names," supplement II, 1957, p. 77, copy in Group 140, TP151Z5C2.

DONALD E. CZAJA, *Primary Examiner.*

R. A. WHITE, *Assistant Examiner.*